Oct. 30, 1934.  G. GASTRICH  1,978,454
METHOD AND MEANS FOR FORMING SPECIAL LOOPS IN KNITTED FABRICS
Filed June 2, 1933   10 Sheets-Sheet 2

FIG.2.

INVENTOR:
Gustav Gastrich,
BY Alfred E. Ischinger,
ATTORNEY.

Oct. 30, 1934.   G. GASTRICH   1,978,454
METHOD AND MEANS FOR FORMING SPECIAL LOOPS IN KNITTED FABRICS
Filed June 2, 1933   10 Sheets-Sheet 3

INVENTOR:
Gustav Gastrich,
BY Alfred E. Dschinger
ATTORNEY.

Oct. 30, 1934.  G. GASTRICH  1,978,454
METHOD AND MEANS FOR FORMING SPECIAL LOOPS IN KNITTED FABRICS
Filed June 2, 1933   10 Sheets-Sheet 4

FIG. 5.

INVENTOR:
Gustav Gastrich,
BY Alfred E. Tschinger,
ATTORNEY.

Oct. 30, 1934.        G. GASTRICH         1,978,454
METHOD AND MEANS FOR FORMING SPECIAL LOOPS IN KNITTED FABRICS
Filed June 2, 1933        10 Sheets-Sheet 5

INVENTOR:
Gustav Gastrich,
BY Alfred E. Ischinger
ATTORNEY.

Oct. 30, 1934.   G. GASTRICH   1,978,454
METHOD AND MEANS FOR FORMING SPECIAL LOOPS IN KNITTED FABRICS
Filed June 2, 1933   10 Sheets-Sheet 6

INVENTOR:
Gustav Gastrich,
BY Alfred E. Ischinger
ATTORNEY.

Oct. 30, 1934.     G. GASTRICH     1,978,454
METHOD AND MEANS FOR FORMING SPECIAL LOOPS IN KNITTED FABRICS
Filed June 2, 1933     10 Sheets-Sheet 7

INVENTOR:
Gustav Gastrich,
BY Alfred E. Ischinger
ATTORNEY.

Oct. 30, 1934. G. GASTRICH 1,978,454
METHOD AND MEANS FOR FORMING SPECIAL LOOPS IN KNITTED FABRICS
Filed June 2, 1933 10 Sheets-Sheet 9

INVENTOR:
Gustav Gastrich,
BY Alfred E. Schinger,
ATTORNEY.

Oct. 30, 1934.  G. GASTRICH  1,978,454
METHOD AND MEANS FOR FORMING SPECIAL LOOPS IN KNITTED FABRICS
Filed June 2, 1933  10 Sheets-Sheet 10

FIG_22_

FIG_23_

FIG_24_

FIG_25_

FIG_26_

FIG_28_

FIG_27_

INVENTOR:
Gustav Gastrich,
BY
ATTORNEY.

Patented Oct. 30, 1934

1,978,454

UNITED STATES PATENT OFFICE 1,978,454

METHOD AND MEANS FOR FORMING SPECIAL LOOPS IN KNITTED FABRICS

Gustav Gastrich, Wyomissing, Pa., assignor to Textile Machine Works, Wyomissing, Pa., a corporation of Pennsylvania Application June 2, 1933, Serial No. 673,985

14 Claims. (Cl. 66—96)

This invention relates to a method of and mechanism for forming special loops, such as the locking loops employed in run-proof fabrics, and to a novel form of loop engaging point member, in combination with a spring beard needle in a knitting machine for the production of such special loops.

In the manufacture of run-resist or run-proof knitted fabrics and articles of wearing apparel, such as run-proof hosiery, plain loops are first formed and then selected loops, for example, alternate loops, have bight portions thereof extended or spread, by means of transfer or other loop spreading points, from the needles about which the loops are originally formed to other needles thereby to produce locking or barrier stitches for limiting or preventing runs in the fabric due to thread rupture. The loops may be spread from one needle to the next adjacent needle, or they may be spread across several needles, in either the same course or in a succeeding course. When a loop is spread from one needle to another needle, a greater thread length than that in a plain loop is required, and since the loop prior to spreading is of ordinary length, the spread loops are under greater tension during the spreading operation than the plain loops, and this results in an increased flexure of the needles and a greater tendency of the loops to slip off the needles during the spreading operation.

It has been proposed heretofore to employ a loop shifting point in which the entire lower portion of one of the side walls which form the groove of the point is cut away to enable the needle beard to remain open at the time the needle and point go to press for insertion of the point into the loop to be spread, so that when the needle and point descend into the knockover bit structure the loop will slide up under the beard of the needle and thereby be prevented from slipping off the needle during the spreading operation. This point construction, however, has a serious drawback because at the time the needle and point go to press, the tip of the point does not remain in the center of the needle groove as it should to operate properly, but is deflected to one side in a direction to cause the beard of the needle to be deflected or forced to one side, and when the needles and points descend into the knockover bit structure the needle beards strike the knockover bits, thus damaging or stripping the beards from the needles, causing excessive breakage and resulting in imperfect fabric.

An object of the invention is the provision, in combination with a spring beard needle in a knitting machine of a loop spreading point adapted to permit the needle beard to remain open during the descent of the needle and point into a knockover bit structure, which point will not cause deflection or distortion of the needle beard, and which will insure accurate alignment of the needle with its associated point during engagement of the point in the needle groove.

Another object of the invention resides in a knitting machine having novel needle and point mechanisms adapted to cofunction in proper time relation to insure that selected loops will pass under the beards of the needles about which they are formed prior to a loop shifting or spreading operation.

Another object is to cause the needle and point mechanisms to cofunction to enable selected loops to pass under the beards of the needles prior to the descent of the needles and their associated points into the knockover bit structure, while substantially unaffecting the timing of the needles and points and their associated mechanisms during their operating cycle.

Another object of the invention resides in the provision of novel cam mechanism for controlling the movements of the points in such manner as to insure that the needle beards will be opened prior to descent of the needles and their associated points into the knockover bit structure, whereby the loops to be spread will slide under the beards at this time and be prevented thereby from slipping off the needles during the spreading operation.

A further object of the invention is the provision of novel cam structure in a knitting machine for controlling the vertical movements of the points, which will cofunction in proper time relation with the needles in the knitting of run-proof fabric, and which will also function to produce plain knit fabric, thereby to enable the machine to selectively produce plain knit fabric, run-proof fabric, or a combination thereof.

With these and other objects in view, which will become apparent in the following description of the illustrative embodiments of the invention shown in the accompanying drawings, the invention resides in the novel method, elements, features of construction, and combination of parts in cooperative relationship, as hereinafter more particularly pointed out in the claims.

Referring to the drawings:

Figs. 1 to 5, and 22 to 28 disclose various parts of a Reading full fashioned knitting machine embodying the mechanisms and elements of my invention. For the sake of clearness I have illustrated only those parts of the various mechanisms necessary for an understanding of the invention; the various other parts and mechanisms and their manner of operation are well known in the art, and are shown and described in detail in the "Reading" Full Fashioned Knitting Machine catalogue (copyright 1929) published by the Textile Machine Works, Reading, Pennsylvania.

Figure 1:
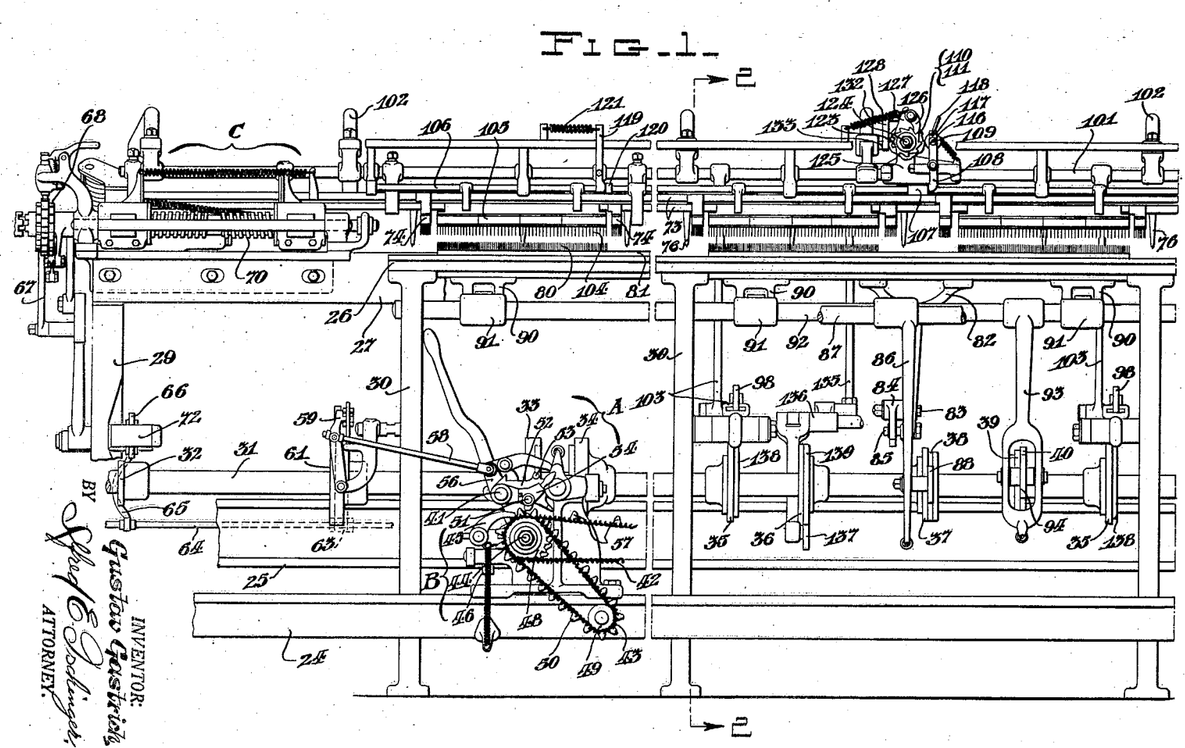
Fig. 1 is a partial front view, in elevation, of a full fashioned stocking knitting machine embodying my invention.
Figure 2:
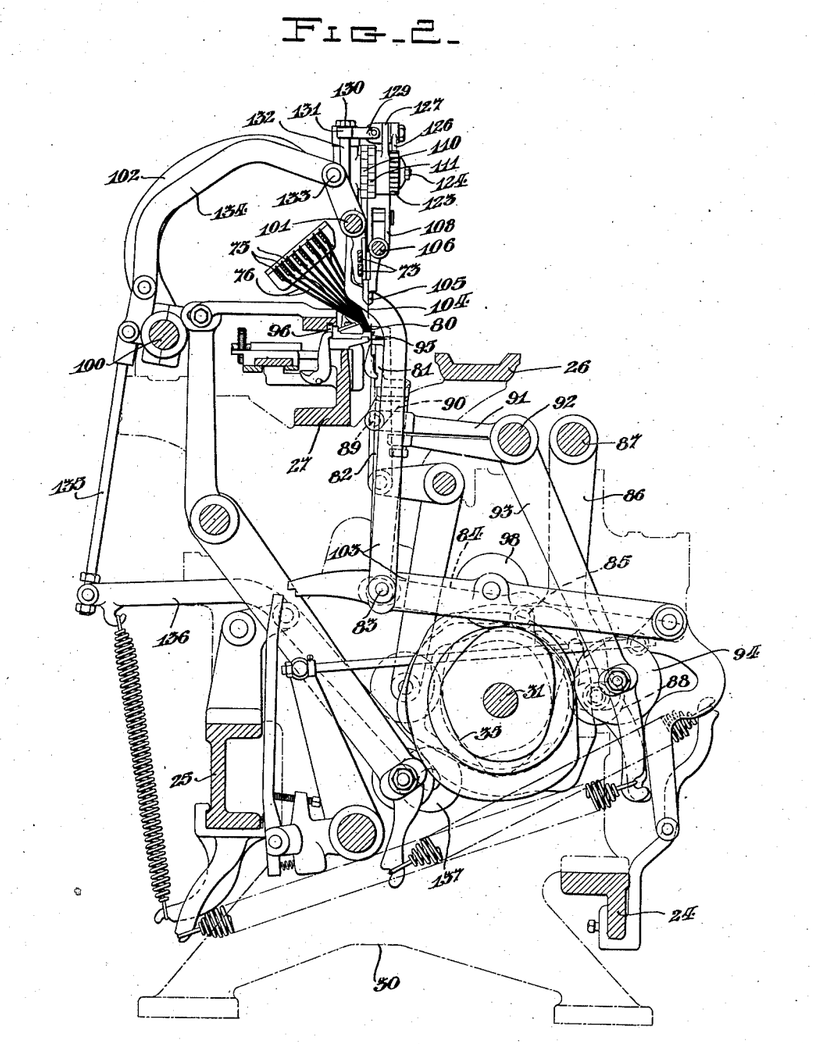
Fig. 2 is a cross sectional view taken substantially along the line 2—2 of Fig. 1.

Referring particularly to Figs. 1 and 2, the machine is shown as comprising a frame of usual construction including front and back beams 24 and 25, front and center beds 26 and 27, and end and center frames 29 and 30. The power mechanism includes the main cam shaft 31 associated with the usual cam shaft shifting device A manipulated by the chain motion mechanism B hereinafter described. The cam shaft carries the cams for the various motions and attachments, including (from left to right as viewed in Fig. 1) a narrowing head actuating cam 32, shogging cams 33 and 34, narrowing lift cam 35, spread loop cam 36, and needle bar presser cams 37 and 38, and needle lever cams 39 and 40, used in the narrowing and plain knitting operations, respectively. The cam shaft is driven by a prime mover, such as an electric motor, through a suitable clutch connection in a manner well known in the art.

Figure 4:
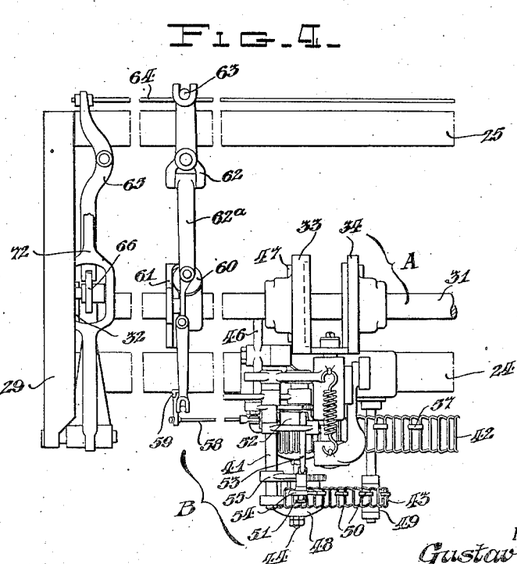
Fig. 4 is a plan view of automatic narrowing head control mechanism adapted for use in conjunction with certain mechanisms of my invention.

The chain motion mechanism B, Figs. 1 and 4, consists preferably of main and auxiliary pattern chains 42 and 43. Chain 42 determines the courses in which a narrowing operation is to take place, in the production of either plain knit or run-proof fabric, and controls the regular narrowing shifting movement of the cam shaft 31 through actuation of the shifting device A in the well known manner, and simultaneously actuates the narrowing head mechanism C in a manner hereinafter described; while chain 43 determines which courses shall be interlocking courses by causing shifting of the shaft 31, without actuating the narrowing head mechanism, in predetermined courses when knitting run-proof fabric.

The auxiliary pattern chain 43 is mounted on an extension 44 of the usual pattern drum axle of main chain 42 and preferably is rotated independently of the main chain, as by its own gear pawl 45 and a lever 46 operatively connected thereto and actuated by a suitable cam 47 on shaft 31. Chain 43 travels around power drum 48 and an idle drum 49, and has suitable buttons 50 clamped thereon adapted to lift lock lever 52, pivotally mounted on stub shaft 41, to effect shifting of the cam shaft (to the right as viewed in Fig. 1) for loop spreading, as required. In order that chain 43 may effect shifting of the cam shaft without causing operation of the narrowing head mechanism of the machine, lock lever 52 is shown with an extension 53 which is actuated only by a button operated lifting lever 54, pivotally mounted on stud 51 carried by a lever 55 rotatably mounted on stub shaft 41, and overhanging pattern chain 43, the buttons 50 on this chain lifting the lever 54 to cause shifting of the cam shaft. Lever 54 is also slidably mounted on the stud 51 so that the lever is slidable at will to either an operative or an inoperative position relative to the row of buttons 50 on chain 43.

Copivotally mounted with lock lever 52 is a lever 56, Fig. 1, operated by buttons 57 on the pattern chain 42. The lever 56 is connected by a rod 58 with a latch 59 controlling the dropping of a roller 60 into operative engagement with a face cam 61 mounted on the cam shaft 31. The roller 60 is carried on a swinging extension 62a of a centrally pivoted lever 62 connected to the upper end of a centrally pivoted lever 63. The lower end of lever 63 is connected to a rod 64 which slidably controls, by means of a centrally pivoted lever 65, the position of a shiftable roller 66 relative to the cam 32. The roller 66 is carried by a lift lever 72 which controls the operation of the narrowing head mechanism in a manner well known in the art.

Figure 3:
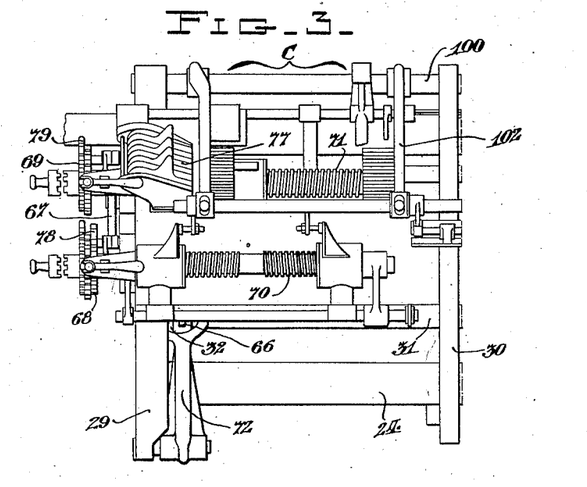
Fig. 3 is a plan view of the narrowing head of the machine.

The narrowing head C, Fig. 3, is of the usual construction, and comprises a ratchet device 67 operatively associated with the ratchets 68 and 69 mounted on the narrowing rod and carrier rod spindles 70 and 71, respectively. Only the narrowing head at the left end of the machine is shown in the drawings; it will be understood, however, that there is a second narrowing head of substantially the same construction at the right end of the machine, and that the two narrowing heads normally cofunction to control the position of the narrowing rods 73, Figs. 1 and 2, and narrowing fingers or combs 74, and the traverse of the carrier rods 75 and yarn carriers 76, in the well known manner, i.e., the spindles 70 of the narrowing heads and their associated devices intermittently rack the narrowing fingers 74 in each knitting section inwardly during the narrowing operations in the production of plain knit fabric, and the spindles 71 control the position of stop members 77 to progressively decrease the traverse of the rods 75 which carry the yarn carriers 76.

In order that the narrowing and yarn carrier spindles may be selectively thrown into operative engagement with the ratchet device 67 the ratchet pawls 78 and 79 associated therewith are pivotally mounted to enable the cams to be manually thrown into or out of engagement with the ratchets on the narrowing rod and yarn carrier rod spindles, respectively. Thus, by throwing both ratchet pawls out of engagement, both spindles 70 and 71 are rendered inactive, and by throwing the pawl 79 into engagement with its ratchet the thread carrier spindle will be rendered operative while the narrowing rod spindle remains inactive. This action renders the narrowing rod mechanism including combs 74 inactive, but permits movement of the thread carrier rod stops 77, whereby the traverse of the yarn carriers 76 and the number of needles engaged by the yarn may be varied and thus fashion the run-proof fabric by varying the width thereof as the fabric is being knit.

The row of needles 80 of each knitting section, Figs. 1 and 2, are of the usual spring beard type, and are supported in a needle bar 81 which is given the necessary vertical and horizontal movements by the usual needle bar actuating mechanism, comprising a bracket member 82 pivotally connected at 83 to rocker arm 84 detachably connected at 85 to presser lever 86 pivoted on rock shaft 87, and provided with a roller or cam follower 88 which cooperates with presser cams 37 and 38 on the machine cam shaft to provide for periodic reciprocation of the needle bar in a horizontal direction, forwardly and rearwardly. Pivotally secured at 89 to a needle bar bracket 90 is a needle bar lifting arm 91 clamped at one end to a rock shaft 92. A needle lever 93, which is also clamped to the rock shaft, is provided with a roller or cam follower 94 which cooperates with cams 39 and 40 to periodically actuate the needle bar in a vertical direction, upwardly and downwardly.

The sinker and divider mechanism is of the usual construction comprising sinkers 95 and dividers 96 mounted in a sinker head having movable knockover bits 97, Figs. 22 to 28. It will be understood that the sinkers and dividers and their associated devices and mechanisms are operated in proper time relation to enable the needles to form loops, and to cofunction with the lock stitch motion mechanism hereinafter described to spread or extend selected loops from the wales in which they originate into adjacent wales of the fabric.

The lock stitch motion mechanism, Figs. 1 and 2, comprises various parts and devices cofunctioning with the parts and mechanisms hereinbefore described to cause point members to engage loops on selected needles and spread or extend the same over adjacent needles to produce interlocking loops alternating in position with respect to each other in succeeding courses of the fabric to enable the same to possess "non-run" characteristics. In the illustrative form shown in the drawings, the lock stitch motion mechanism includes parts of the usual narrowing machine, including the rear narrowing shaft 100, front narrowing shaft 101 and lifting arms 102 for rocking the frame of the narrowing machine about the shaft 100 in the usual manner to give the various loop engaging point members carried by the narrowing machine the necessary dipping movements relative to the needles, the shaft 101 being pivotally connected to levers 103 carrying rollers 98 cofunctioning with the narrowing lift cams 35 on the main cam shaft 31. In the preferred form of the invention the contour of the narrowing lift cams has been changed, Fig. 5, to effect suitable coaction between the points and needles during certain operations when knitting spread loop fabric, described hereinafter in detail in setting forth the operation of the various mechanisms.

The point members 104, which are of special construction to enable the same to properly cofunction with the lock stitch motion mechanism in a manner hereinafter described, are clamped in a bar 105 secured to a shiftable rod 106 directly carried by the front narrowing shaft 101. In order to spread or extend loops from selected needles to adjacent needles, it is necessary to laterally shift the rod 106 a distance of one or more needles at the proper time in the cycle of operation of the points and needles. Any of the various known mechanisms suitable for the purpose may be employed for laterally shifting the rod to perform the loop spreading operation, but I preferably employ mechanism of the type disclosed and claimed in my copending application, Serial No. 623,206, filed July 18, 1932, the general construction of which is as follows:

The rod 106 carries a collar 107 engageable with one end of a centrally pivoted lever 108, the other end of which carries a roller 109 adapted to be selectively brought into engagement with either of two pattern cam discs 110 and 111. As more clearly shown in Figs. 7 and 8, the cam disc 110 is provided upon its periphery with alternating depressions 112 and projections 113 of predetermined size and relation to cause shifting movement at the proper times of rod 106 to spread loops 1a over pairs of adjacent needles and to alternate the positions of the spread loops 1 in succeeding interlocking courses 2, 2a, Fig. 27; while in cam disc 111 the depressions 114 and projections 115 are in a different relation to spread the loops 1 alternately in opposite directions if so desired. For the purpose of selectively moving the roller 109 into engagement with either of the discs 110 and 111, the roller is slidably mounted on an axle 116 and is positioned between the walls of a suitable recess in a slidable pin 117, the operative position of which is controlled by a handle 118. The lever 108 is utilized to force the rod 106 to the left, as shown in Fig. 1, and an additional lever 119 is provided to shift the rod 106 to the right, the lever 119 being pivoted on the front narrowing shaft, and having one end engaging a collar 120 secured to the rod 106 and its other end connected to a spring 121 urging the lever in a direction to force the rod 106 to the right. Therefore, when the projection 113 on cam disc 110 engages the roller 109 of lever 108, the rod 106 will be shifted to the left, and when the roller 109 engages a recess in the cam 110, the lever 119 will force the rod 106 to the right, thereby shifting the row of points 104 back and forth relative to the row of needles 80. The projections and recesses of each of the discs are arranged in sets at different radial distances from the center of the disc in such manner that the rod 106 is shifted into two different positions by the projections and into two different positions by the recesses to produce the staggered arrangement of the spread loops in adjacent interlocking courses.

For the purpose of manipulating either of the discs 110 and 111 in proper time relation with respect to the various operations of the machine, a ratchet wheel 123 is secured to and rotatable with the discs 110 and 111, and mounted on the stub shaft 124 connected to a bracket 125 fixed to the front narrowing shaft of the narrowing machine to dip therewith. The ratchet wheel is rotated by a pawl 126 pivoted to an arm 127 swingingly mounted on the stub shaft 124. The arm 127 is held in a retracted position by a spring 128, and is forced in the opposite direction by engagement with one arm 129 of a pivoted bell crank lever 130 which has its other arm 131 provided with a pin 132 arranged in the path of travel of a second pin 133 carried by a toggle link connection 134 pivotally mounted on the rear narrowing shaft 100 and including a rod 135 connected to a pivotal lever 136 carrying a roller 137 engageable with the spread loop cam 36 when the cam shaft 31 is shifted to the right by the pattern chain mechanism hereinbefore described.

Figure 9:
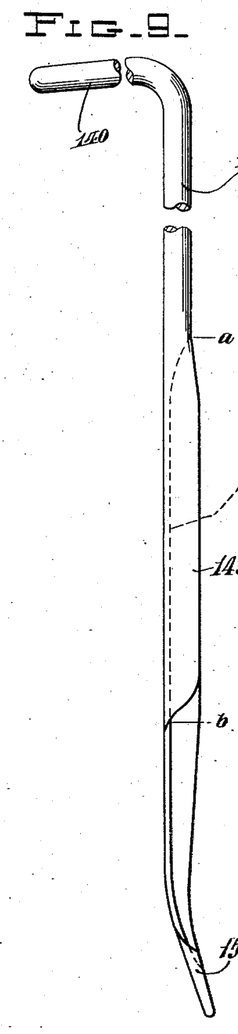
Fig. 9 is a side view of a loop spreading point in accordance with my invention, adapted to produce right spread loops.
Figure 10:
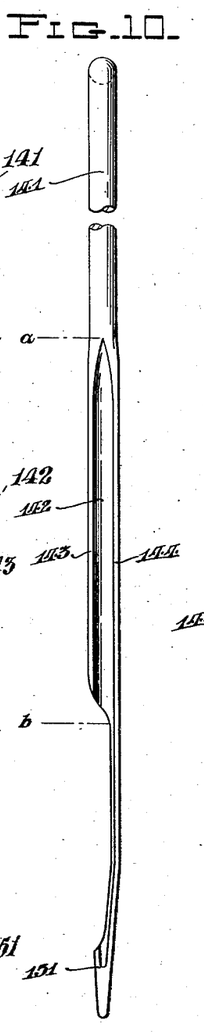
Fig. 10 is a front view of the point member of Fig. 9.
Figures 11, 12:
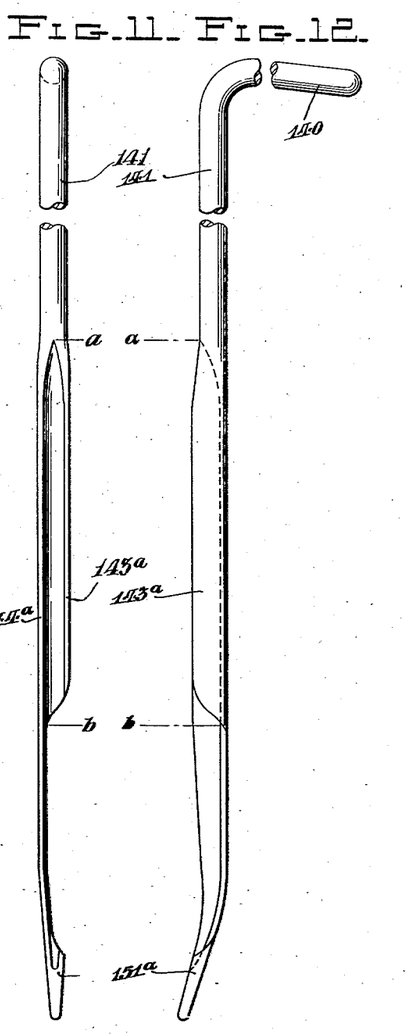
Fig. 11 is a front view of a loop spreading point member adapted to produce left spread loops.
Fig. 12 is a side view of the point member of Fig. 11.
Figure 23:
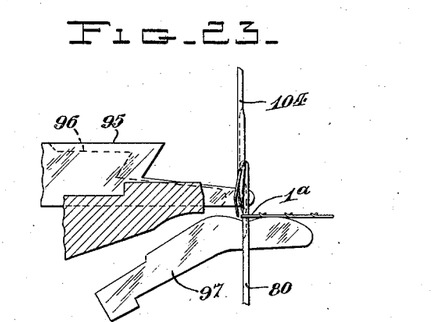
Figure 24:
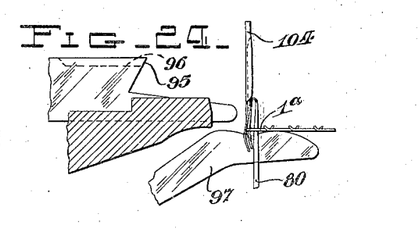

The point member preferably employed in connection with the lock stitch motion mechanism is shown in detail in Figs. 9 to 14; Figs. 9, 10, 13 and 14 show a point member adapted for spreading the interlocking loops 1 to the right, Fig. 27, while Figs. 11 and 12 show the same type of point adapted to produce left spread loops. The point member comprises a butt portion 140, a stem or shank 141, and a groove 142, defined by side walls 143, 144, adapted to receive the spring beard 145 of the associated needle 80. As shown in Figs. 9 and 10 the side wall 143 terminates intermediate the grooved portion of the point and the tip thereof, the wall being removed or omitted from b to the tip of the point for the purpose of permitting the spring beard 145 to open after the needle and point have gone to press and are in the position shown in Figs. 13, 14 and 23, so that the loop 1a into which the point is inserted will slide under the beard of the needle during descent of the needle and point into the knockover bit structure, as illustrated in Fig. 24, whereby the loop spreading points may be caused to travel in the same path as, and have substantially the movements of, transfer points in the usual narrowing or other loop transfer operations.

Figures 15, 16:
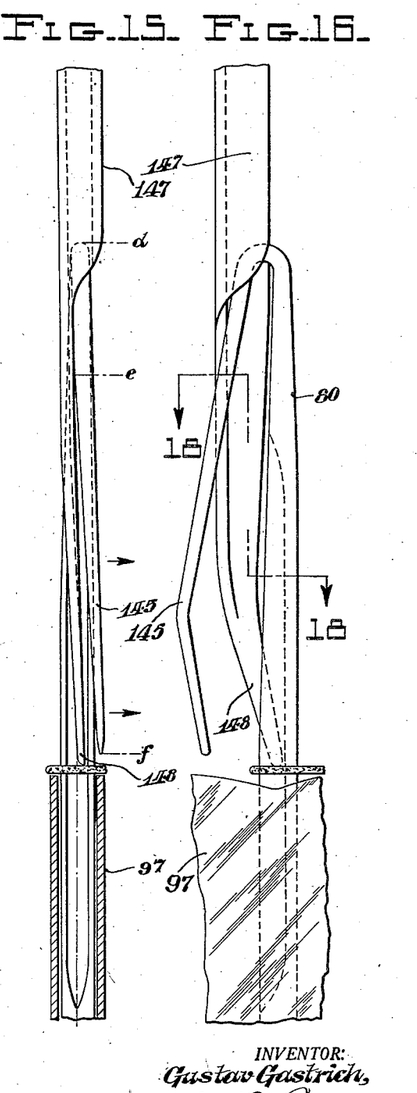
Figs. 15 and 16 are enlarged fragmentary front and side views of a needle and loop spreading point, illustrating the manner in which misalignment of a point causes deflection of the needle beard.
Figure 18:
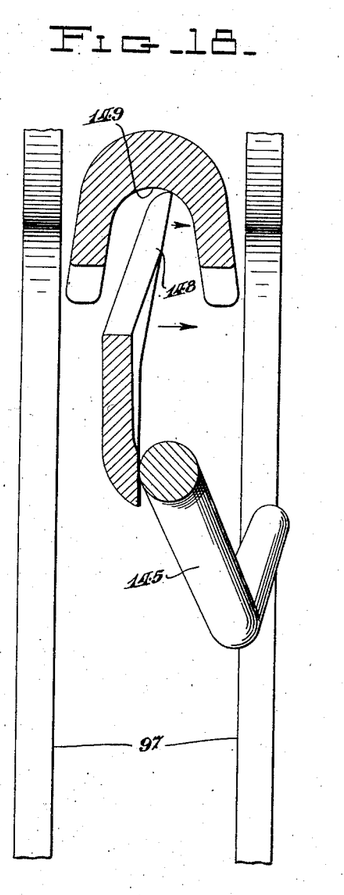
Fig. 18 is a greatly enlarged cross sectional view taken substantially along the line 18—18 of Fig. 16, the view being rotated through an angle of ninety degrees in the manner of Fig. 17.

It has heretofore been proposed to employ a loop spreading point, such as shown in Figs. 15 and 16, in which one of the walls 147 is cut away throughout the greater part of its length and through the tip 148 of the point in order to permit the needle beard 145 to remain open at the time the needle and point go to press. This form of point, however, has proved impracticable because of the fact that a large number of needle beards are deflected sidewise by the points, as shown in Fig. 15, at the time the needles and points go to press, the needle beards being deflected to such an extent that a large number of them strike the knockover bits 97 and are stripped thereby from the needles during descent of the needles and points into the knockover bits. I have found that the principal reason for this excessive deflection and breakage of the needle beards is as follows:

Referring to Fig. 18, which is a greatly enlarged cross sectional view taken as indicated by the line 18—18 of Fig. 16, except that the view is rotated so that the beard of the needle is towards the observer, it will be seen that the bottom 149 of the needle groove has a relatively broad rounded surface. At the time the needle and point go to press and the tip 148 of the point enters the needle groove, considerable pressure is exerted upon the needle and point, and since one half of the lower end including the tip of the point has been cut away, the point is unsymmetrical and is off center with respect to the needle groove; the point therefore tends to center itself by sliding upon the rounded cam-like surface of the bottom of the needle groove, so that the point is displaced in the direction of the arrows, Figs. 15 and 18. The point engages the side of the needle beard at e at the time the point and needle go to press, and therefore displacement of the point in the direction of the arrows (to the right as viewed in Figs. 15 and 18) causes deflection of the needle beard in the same direction.

It would ordinarily be assumed that the relatively small displacement of the point would have little practical effect upon the needle beard; a consideration of the following factors, however, shows otherwise. The distance from e, where the point presses against the needle beard, to f at the tip of the point is but a small part of the distance from the tip of the point to the place where the point is clamped to the point bar, and therefore the lateral displacement which occurs at e is substantially of the same extent as that at the tip of the point; the distance from d at the end of the needle to e, however, is much less than the distance from e to f at the tip of the needle beard, so that the displacing movement imparted by the point to the beard at e is multiplied several times at the tip of the beard, and thus for any given displacement of the tip of the point there results therefrom a much greater displacement at the tip of the beard. Therefore, a relatively small displacement of the point in the needle groove causes the beard to be deflected to an extent such that it is liable to strike the knockover bit structure when the needle and point descend.

Figure 17:
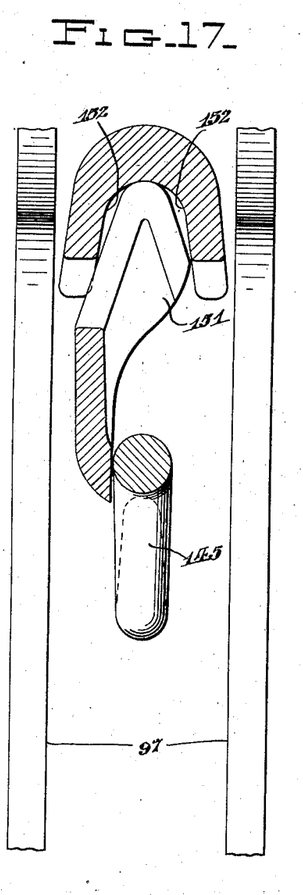
Fig. 17 is a greatly enlarged cross sectional view taken substantially along the line 17—17 of Fig. 14, the view being rotated through an angle of ninety degrees so that the beard of the needle is towards the observer.

In a point member constructed in accordance with the invention (more clearly seen in the enlarged views of Figs. 13, 14 and 17) there is provided a section of metal 151 at the tip of the point so that the tip is symmetrical and is of such size and configuration as to closely fit in the needle groove and coact with both walls 152 of the needle to insure that the point will be accurately centered in the needle groove and will be maintained in accurate alignment therewith, and thus the needle beard is not deflected by the point and retains its normal position.

Figures 13, 14:
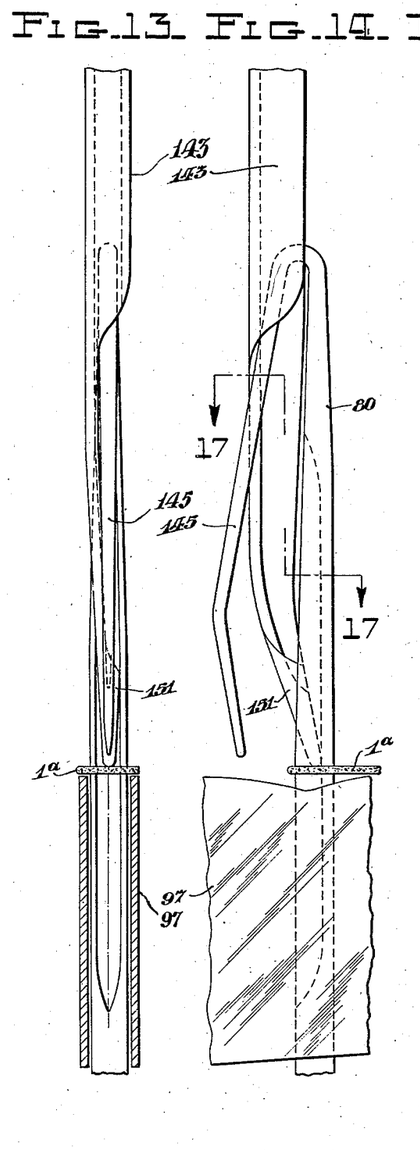
Figs. 13 and 14 are enlarged fragmentary front and side views of a needle and loop spreading point, showing the alignment of and coaction between the needle and a point constructed in accordance with the invention.
Figure 19:
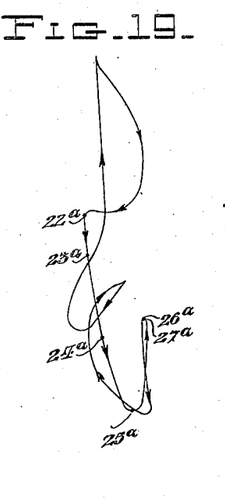
Fig. 19 is a diagram of the path of travel of the needles, as viewed from the left hand end of the knitting section, during the loop spreading cycle.
Figure 20:
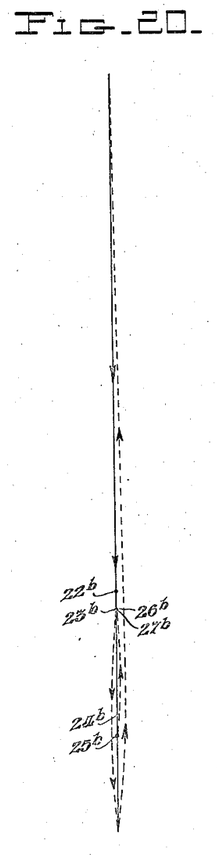
Fig. 20 is a diagram illustrating an end view of the path of travel of the points.
Figure 21:
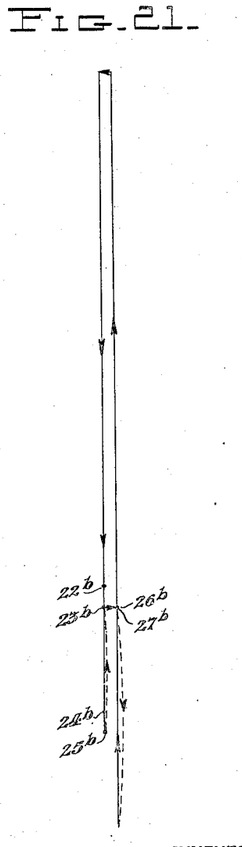
Fig. 21 is a diagram illustrating a front view of the path of travel of the points.
Figure 22:
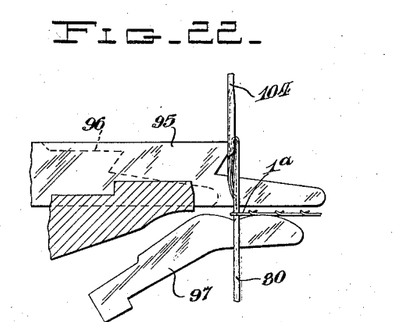
Figs. 22 to 26 are views illustrating various positions of the points and needles in forming spread loops.

It has also been found desirable to have the wall 143 of the point, Figs. 9 and 10, of such length from a to b that the end of the needle will be received in the point groove early in the pressing operation, as shown in Fig. 22, thus providing an additional means for aligning the point with the needle so that the point will be aligned at two points with respect to the needle at the time the needle and point go to press. The longer wall portion also materially strengthens the point at the place where considerable stress is exerted thereon by the loop 1a engaged by it during the spreading operation, and prevents or minimizes bending and breakage of the point. This wall portion from a to b is of such length that in the ordinary coaction between the needle and point when they go to press the needle beard is closed, Fig. 22, and would remain closed instead of opening to permit sliding of the loop under the beard. Preferably, the wall extends more than half the distance between the upper end a of the point groove and the tip 151 of the point. In order to cause the beard to reopen, the normal downward travel of the point is retarded for a brief interval of time, immediately after the needle and point go to press, to cause relative sliding movement between them thereby to decrease the extent of overlap therebetween and thus permit the needle beard to open prior to, and remain open during the descent of the needle and point together into the knockover bit structure, as shown in Figs. 13, 14 and 23, to insure that the loop 1a will slide under the beard. In the machine illustrated in the drawings, the contour of the narrowing lift cam, Fig. 5, has been changed between 22b and 24b; from 22b to 23b the edge of the cam is somewhat higher than usual in order to slow up or retard the downward travel of the point relative to the needle for a short interval of time immediately after the needle and point have gone to press, Fig. 22, and until the needle beard has opened, Fig. 23. From 23b to 24b the edge of the cam is sloped downwardly to an extent such that the downward movement of the point is accelerated during a brief interval of time, and at 24b, which corresponds to the position of the needle and point after they have descended into the knockover bits, Fig. 24, the point and needle are again in their usual positions relative to each other. In this manner, the timing of the needle and point relative to each other is unchanged except during a very slight interval in their path of travel, and the timing of the needle and point relative to their associated devices and mechanisms remains unchanged. Figs. 19 to 21 diagrammatically show the paths of travel of the needles and points during the various steps involved in the loop spreading operation illustrated in Figs. 22 to 27. Since the timing and operation of the parts of the knitting machine remain substantially unchanged, it is thereby possible to readily adapt existing installations for the production of run-proof fabric by the simple expedient of replacing the usual narrowing lift cams by cams having a contour similar to that of Fig. 5, and adding point bars having the type of spread loop points herein disclosed. The change in the contour of the narrowing lift cams does not appreciably affect their action when performing narrowing or other loop transfer operations, thereby enabling a machine so equipped to selectively knit run-proof and plain knit or other types of fabrics ordinarily producible on the machine, or any desired combination thereof.

Figure 6:
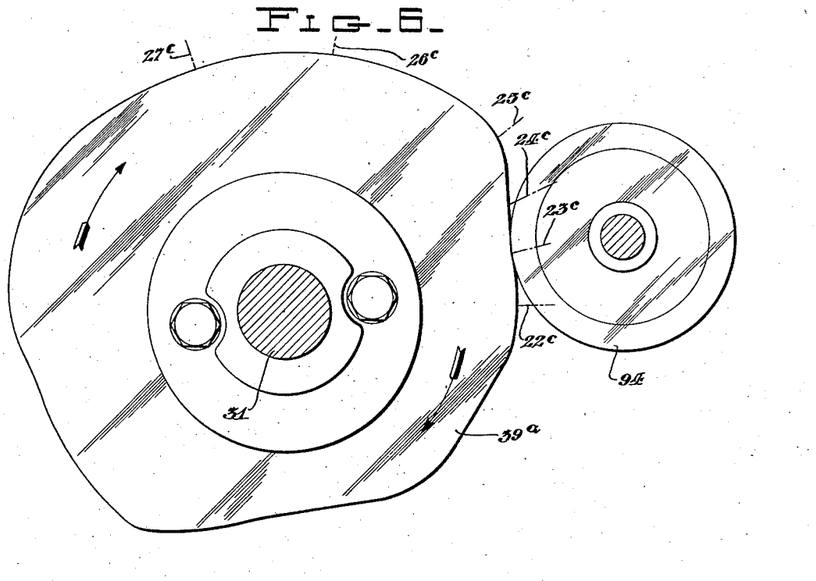
Fig. 6 is a side view, in elevation, of a different cam structure adapted for use in a modified form of the invention.

Instead of changing the contour of the narrowing lift cam as above described, the contour of the needle lever cam used in narrowing may be changed to permit the needle beard to open prior to the descent of the needle and point together into the knockover bit structure. Referring to Fig. 6, the contour of the needle lever cam 39a has been changed between 22c and 24c; from 22c to 23c the edge of the cam is somewhat higher than usual in order that the downward movement of the needle relative to the points is accelerated for a short interval of time immediately after the needle and point go to press and until the needle beard has opened. From 23c to 24c the edge of the cam slopes downwardly in order to slow up or retard the downward travel of the needle relative to the point and at 24c, which corresponds to the position of the needle and point after they have descended into the knockover bits, the needle and point are again in their usual positions relative to each other. It will be understood that when the needle cam is so modified the usual narrowing lift cam may be employed, and that the timing of the needle and point relative to the other parts of the machine is unaffected.

Figure 25:
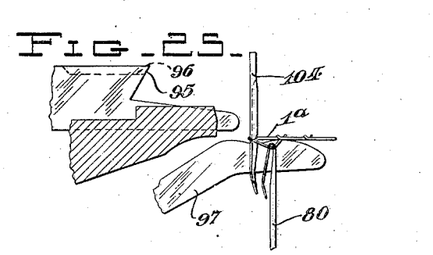
Figure 26:
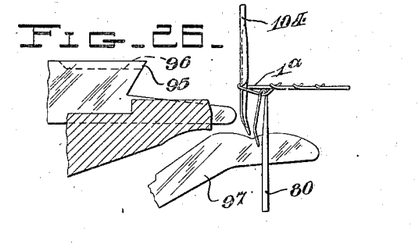
Figure 27:
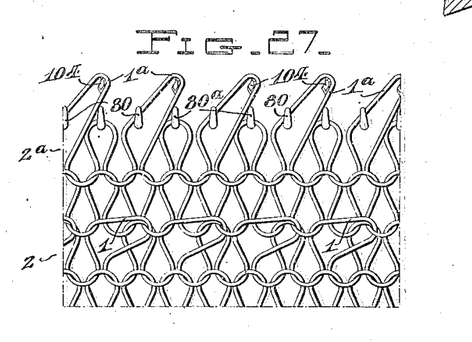
Fig. 27 is a diagrammatic perspective view illustrating another position of the points and needles while knitting run-proof fabric.

Figs. 22 to 26 illustrate one each of a series of needles 80, loop spreading points 104, sinkers and dividers 95, 96, and knockover bits 97 in various relative positions during the loop spreading operation in producing the fabric of Fig. 27.

Figure 28:
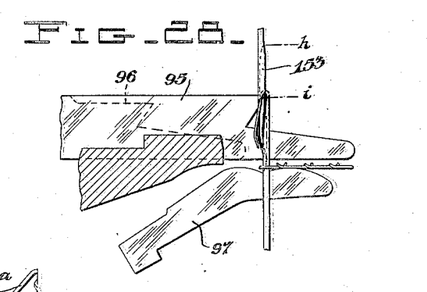
Fig. 28 shows a modified form of point in one operating position.

Fig. 28 illustrates a modified form of point 153 having its tip constructed in the manner of the point 104 hereinbefore described, but in which the side wall is cut away to a greater extent, the length h to i thereof being reduced so that the needle beard is not closed by the point when the needle and point go to press. The position of the point in Fig. 28 corresponds to the position of the point 104 in Fig. 22, and it will be seen that the needle beard in Fig. 28 is not closed by the point at the time the needle and point go to press, the beard remaining open during the entire time that the needle and point are in contact with each other. This form of point may be used with the regular narrowing lift cams employed for narrowing and other loop transfer operations since it is unnecessary to retard the downward movement of the point in order to permit the needle beard to open, and while this form of point is not as rugged as the preferred form of point 104, it insures accurate alignment of the needle and point and for various purposes may be employed with substantially the advantages of the preferred form.

*Operation*

In Fig. 1 the cam shaft 31 and cam members are in the plain knitting position, at which time the rollers 98 and 137 are in engagement with round idle cams 138 and 139, respectively, and therefore no movement is imparted to the narrowing machine or lock stitch motion mechanism. When a lock stitch course is to be produced, for example, in alternate courses of the fabric, a button 50 on pattern chain 43 actuates the lever 54, thus releasing latch arm 52 and causing the cam shaft to shift to the right a distance equal to the width of a cam, or 9/16 inches in the Reading machine. The rollers 98 are now in engagement with the narrowing lift cams 35, the contour of these cams being such as to cause the narrowing machine to dip twice for each revolution of the cam shaft in the usual manner. Assuming that there is no actuating button 57 on the main pattern chain 42 in position to operate the lever 56 at this time, no movement is imparted to the roller 66, and since the roller is normally spaced a distance of at least the width of a cam from the narrowing head cam 32, the roller is not engaged by the cam at this time, notwithstanding that the cam shaft has been shifted to the right.

The shifted position of the cam shaft brings the spread loop cam 36 into operative engagement with its roller 137 of lever 136, and rotation of cam 36 actuates the pawl 126 and ratchet 123 (through the toggle link mechanism 127—135) to ratchet the pattern cam 110 or 111, as the case may be, to the proper position to cause the points 104 to engage loops on selected needles in the dipping movement of the narrowing machine. Further rotation of cam 36 causes the pawl to again ratchet the pattern cam to a position to cause shifting of the rod 106 to spread the loops in proper time relation with respect to the movements of the needles to cause one limb of each loop engaged by the points to slide under the beard of its needle and to have its bight portion extended or spread around the stem of an adjacent needle in the rising movement of the needles during delivery of the bight portions of the loops.

Figure 7:
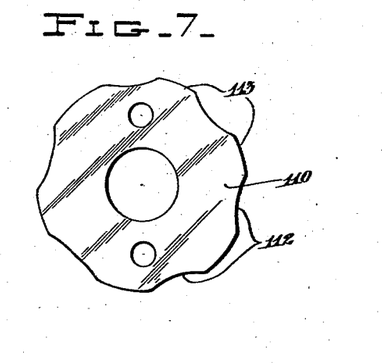
Figs. 7 and 8 are side views, in elevation, of pattern cams for controlling the spreading movements of the points.
Figure 8:
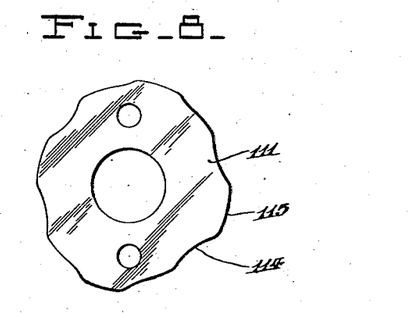

Referring to Fig. 26 it will be seen that when the loop is being elongated or spread, the sinkers and dividers have been retracted to prevent interference with the points in the lateral shifting thereof. As hereinbefore stated, and as shown in Figs. 7 and 8, the cam surfaces of the pattern cams are such as to twice change the normal position of the rod 106 for a subsequent shift thereof to alternate or stagger the spread loops walewise of the fabric as illustrated in Fig. 27.

Referring to Figs. 22 to 27 inclusive, there is shown the relative movement of a single point 104 in the row of points and a single needle 80 in the row of needles for spreading the loop 1a about adjacent needles. Fig. 22 shows the point in the beginning of its descent and immediately after the needle and point have gone to press; it will be seen that the two walls of the point groove engage the end of the needle, and that the tip of the point is engaged in the groove of the needle, thus providing two points of alignment of these members relative to each other. At this time the needle beard has been closed by the action of the point.

In Fig. 23 the point and needle have continued their downward descent, but the movement of the point relative to the needle has been retarded by the action of the narrowing lift cam in the manner hereinbefore described, so that the degree of overlap of the needle and point is decreased to an extent sufficient to cause the beard of the needle to open prior to the descent of the needle and point into the knockover bits, thus enabling the loop 1a to slide under the beard in the further downward movement of the needle and point, as shown in Fig. 24.

Fig. 25 shows the point and needle after they have descended into the knockover bits, at which time the needle has moved away from the point, with one limb of the loop retained under the beard of the needle.

Fig. 26 illustrates the relative positions of the point and needle after they have risen to a position such that the point is above the knockover bit structure, at which time the point is shifted laterally for extending the bight portion of the loop in position to be delivered to an adjacent needle.

Fig. 27 is a plan view looking down upon the fabric as it is knit, and shows the points 104 and the bight portions of the loops 1a thereon in position to be engaged by adjacent needles 80a in the rising thereof, thus completing the spreading operation thereby to produce an interlocking course as shown, the spread loops in adjacent interlocking courses 2, 2a being staggered thereby to lock each wale of the fabric.

Figure 5:
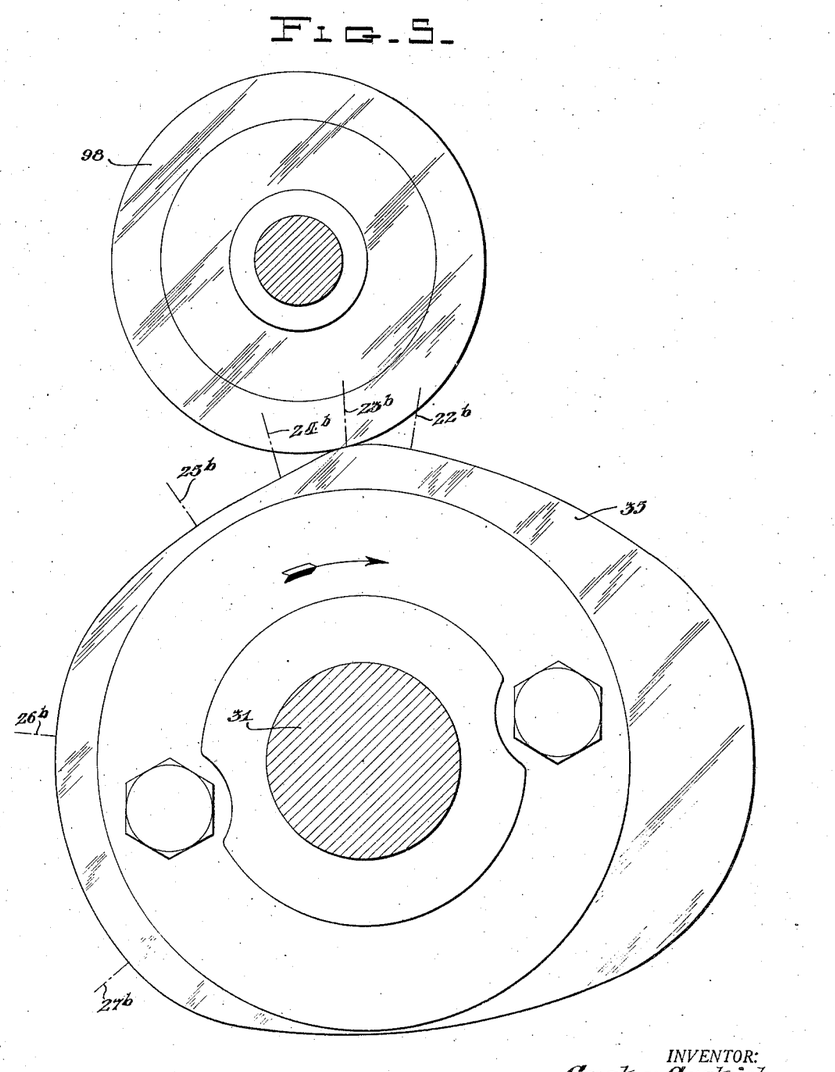
Fig. 5 is a side view, in elevation, of a preferred form of cam structure for controlling the vertical movement of the points.

As hereinbefore stated the beards of the needles are closed by their engagement with the points 104 at the time the needles and points go to press, Fig. 22, and in order to cause the needle beards to open immediately thereafter, the contour of the usual narrowing lift cam may readily be changed, as shown in Fig. 5, to decrease the speed of the points relative to the needles at this time thereby to decrease the extent of overlap of the points and needles, and immediately after the needles and points have descended into the knockover bit structure the speed of the points is increased until the needles and points are again in their usual relative positions. This action may also be obtained by modifying the usual needle lever cam used in narrowing, Fig. 6, so as to increase the speed of the needles relative to the points immediately after the needles and points have gone to press thereby to decrease the extent of overlap therebetween and thus cause the needle beards to open, and to decrease the speed of the needles immediately after the needles and points have descended into the knockover bit structure until the needles and points again assume their usual positions relative to each other. In either case the timing of the points and needles relative to each other are unchanged except for the brief interval between the time the needles and points go to press and the time they descend into the knockover bit structure. In this manner the timing of the points and needles with respect to the other elements of the machine remains unaffected, and thus the normal coaction between and operation of the various mechanisms and parts of the knitting machine remain unchanged.

When the modified form of point 153, Fig. 28, is used it is, of course, unnecessary to retard the point movement or speed up the needle movement in order to permit the beard to open since the beard is not closed by pressure of the point against it at the time the needle and point go to press, as illustrated in the figure. Otherwise, the action of the point 153 is the same as that of the point 104, and the various movements of the point during the spreading operation are the same as those of point 104 in Figs. 23 to 27 inclusive.

The main pattern chain 42 functions in the ordinary manner for timing the shifting of the cam shaft 31, to the right as viewed in Figs. 1 and 4, for ordinary narrowing in preselected courses in the production of plain knit fabric, at which time the roller 66 is shifted to the left, by means of the buttons 57 on chain 42, into the path of travel of cam 32 thereby setting into operation the ratchet device 67 of the narrowing head for manipulating spindles 70 and 71 by means of the pawl and ratchet elements 68, 69, 78, 79, Fig. 3. It will be understood that in the production of plain knit fabric the points 104 ordinarily will be turned up out of the way, as by manually rotating the rod 106. When the yarn carriers are to be controlled in their travel for narrowing the stocking blank without resorting to the operation of the narrowing combs 74, as when knitting run-proof, lace or other special loop fabrics, the pawl 78 is thrown out of active position and the yarn carrier pawl 79 retained in engagement with its ratchet 69 on the yarn carrier spindle.

Thus, when knitting interlocking or other special loop courses in the stocking, as determined by buttons 50 on pattern chain 43 for shifting the cam shaft to the right, only the loop forming mechanism and the lock stitch motion mechanism are operated, but when the width of the stocking blank is to be narrowed or fashioned in certain courses, as determined by buttons 57 on main pattern chain 42, the roller 66 is shifted to the left into operative engagement with cam 32, and the ratchet device is set into operation and automatically racks the spindle mechanism for controlling the limits of travel of the yarn carriers in traversing the knitting field, thereby varying the width of the stocking blank by varying the distance of travel of the yarn to control the number of needles engaged thereby in the various courses.

While I have described the invention in connection with a Reading full fashioned knitting machine of conventional type, it is to be understood that my invention may also be used with knitting machines of various other makes and types adapted to produce stockings or other knitted fabrics and articles of wearing apparel, including single unit machines in which the entire stocking blank or other article is produced on one machine.

For brevity in the specification and claims, the term "run-proof fabric" is used in a generic sense and includes a fabric having one or more interlocking or barrier courses and in which a run will not take place, or in which a run is limited, depending upon the specific arrangement of barrier courses and interlocking loops employed; the term "spread" refers to a loop that extends from the needle creating the loop to another needle, either in the same course or in a succeeding course of the fabric, in counterdistinction to plain and transferred loops, which latter loops are bodily lifted from one needle and deposited upon an adjacent needle, and the statement that the loop spreading point is adapted to permit the needle beard to remain open while the point is engaged in the groove of the needle refers to both forms of point structure, viz., the form in which the needle beards are temporarily closed, or partially closed, when the needles and points go to press, and then are permitted to reopen, and the form in which the needle beards remain open when the needles and points go to press.

Of course, the improvements specifically shown and described may be changed and modified in various ways without departing from the invention herein disclosed and hereinafter claimed.

I claim:

1. In a straight knitting machine, the combination with a series of spring beard needles and a series of points cooperatively associated therewith, and means for relatively moving said needles and points to cause the points to enter the grooves of selected needles and engage loops thereon, each of said points having an apertured wall structure to permit the needle beards to remain open while the needles and points are in engagement with each other; of means for retarding the downward movement of said points relative to said needles to cause the needle beards to open prior to the descent of the needles and points into the knockover bit structure, said means increasing the downward movement of said points relative to the needles after the same have descended into the knockover bit structure to restore the needles and points to their usual relative positions.

2. In a straight knitting machine for producing spread loops in a fabric, the combination of a series of spring beard needles and a series of points cooperatively associated therewith, means for relatively moving said needles and points to cause the points to enter the grooves of selected needles and engage loops thereon, each of said points having its wall structure formed to provide clearance for the needle beards and enable the beards to open after the needles and points have gone to press, and means operative when the needles and points go to press for causing relative sliding movement between the needles and points in a direction to decrease the overlap therebetween to cause the needle beards to open prior to the descent of the needles and points into the knockover bit structure thereby to enable said needle loops to slide under the beards and be retained thereby during the loop spreading operation, said means causing relative sliding movement between the points and needles after the same have descended into the knockover bit structure in a direction to cause the needles and points to again assume their usual relative positions.

3. In a straight knitting machine for producing spread loops in a fabric, the combination of a series of spring beard needles and a series of points cooperatively associated therewith, means for forming a course composed of alternate sinker and needle loops with needles in said needle loops, means for relatively moving said needles and points to cause the points to enter the grooves of selected needles and engage loops thereon, each of said points having its wall structure formed to provide clearance for the needle beards to enable the beards to open after the needles and points have gone to press, and means operative when the needles and points go to press for retarding the downward movement of said points relative to said needles to decrease the overlap therebetween and cause the needle beards to open prior to the descent of the needles and points into the knockover bit structure to enable the said loops to slide under the beards and be retained thereby during the loop spreading operation, said means accelerating the downward movement of said points relative to the needles after the same have descended into the knockover bit structure to cause the needles and points to again assume their usual relative positions.

4. In a straight knitting machine for producing spread loops in a fabric, the combination of a series of spring beard needles and a series of points cooperatively associated therewith, means for relatively moving said needles and points to cause the points to enter the grooves of selected needles and engage loops thereon, each of said points having its wall structure formed to provide clearance for the needle beards and enable the beards to open after the needles and points have gone to press, and means comprising rotary cam structure operative when the needles and points go to press for causing relative sliding movement between the needles and points in a direction to decrease the overlap therebetween to cause the needle beards to open prior to the descent of the needles and points into the knockover bit structure, thus enabling said needle loops to slide under the beards and be retained thereby during the loop spreading operation, said cam structure causing relative sliding movement between the points and needles after the same have descended into the knockover bit structure in a direction to cause the needles and points to again assume their usual relative positions.

5. In a straight knitting machine for producing spread loops in a fabric, the combination of a series of spring beard needles and a series of points cooperatively associated therewith, a rod supporting said points, and means including mechanism for dipping said rod and points towards said needles to cause the points to enter the grooves of selected needles and engage loops thereon, each of said points having its wall structure formed to provide clearance for the needle beards and enable the beards to open after the needles and points have gone to press, and means comprising cam structure controlling the dipping movement of said mechanism when the needles and points go to press for retarding the downward movement of said points relative to said needles to decrease the overlap therebetween and enable the needle beards to open prior to the descent of the needles and points into the knockover bit structure thereby to enable said loops to slide under the beards and be retained thereby during the loop spreading operation, said cam structure accelerating the downward movement of said points relative to the needles after the same have descended into the knockover bit structure to cause the needles and points to again assume their usual relative positions.

6. In a straight knitting machine for producing spread loops in a fabric, the combination of a series of spring beard needles and a series of points cooperatively associated therewith, a rod supporting said points, and means including a narrowing machine for dipping said rod and points towards said needles to cause the points to enter the grooves of selected needles and engage loops thereon, each of said points having its wall structure formed to provide clearance for the needle beards and enable the beards to open after the needles and points have gone to press, and means comprising cam structure controlling the dipping movement of said narrowing machine when the needles and points go to press for retarding the downward movement of said points relative to said needles to decrease the overlap therebetween and enable the needle beards to open prior to the descent of the needles and points into the knockover bit structure thereby to enable said loops to slide under the beards and be retained thereby during the loop spreading operation, said cam structure accelerating the downward movement of said points relative to the needles after the same have descended into the knockover bit structure to cause the needles and points to again assume their usual relative positions.

7. In a full fashioned knitting machine having loop forming elements including spring beard needles, knockover bits, and actuating means therefor, and point members coacting with said needles to produce spread loops in a fabric; rotatable cam members for vertically moving said needles and points relative to each other to cause the points to enter the grooves of selected needles to engage loops thereon, one of said rotatable cam members being adapted to decrease the degree of overlap of the points and needles after the same have gone to press and prior to the entry of the points and needle beards between the knockover bits during their downward travel, thereby to cause the beards to open and enable said loops to slide under the beards.

8. In a full fashioned knitting machine having loop forming elements including spring beard needles, knockover bits, and actuating means therefor, and point members coacting with said needles to produce spread loops in a fabric; rotatable cam members for vertically moving said needles and points relative to each other to cause the points to enter the grooves of selected needles to engage loops thereon, one of said rotatable cam members having a contour adapted to decrease the rate of travel of the point members relative to the needles prior to the entry of the points and needle beards into the knockover bits during their downward travel, thereby to cause the beards to open and enable said loops to slide under the beards.

9. In a full fashioned knitting machine having loop forming elements including spring beard needles, knockover bits, and actuating means therefor, and point members coacting with said needles to produce spread loops in a fabric; rotatable cam members for vertically moving said needles and points relative to each other to cause the points to enter the grooves of selected needles to engage loops thereon, one of said rotatable cam members having a contour adapted to increase the rate of travel of the needles relative to the point members after the needles and points have gone to press and prior to the entry of the points and needle beards into the knockover bits during their downward travel, thereby to cause the beards to open and enable said loops to slide under the beards.

10. In a knitting machine, the combination of a spring beard needle and an associated loop spreading point, said point having a groove therein for receiving the beard of the needle and a wall structure adapted to permit the needle beard to remain open while the point is engaged in the groove of the needle, the tip of the point having a contour such that it coacts with both walls of the needle groove to prevent substantial displacement of the tip of the point in said needle groove when the needle and point go to press, and means including cam structure for decreasing the overlap between said needle and point thereby to cause the needle beard to remain open during the descent of the needle and point into the knockover bit structure.

11. In a full fashioned knitting machine having narrowing head mechanism, a cam shaft having an operating cam for said narrowing head mechanism, loop forming elements including spring beard needles and associated loop spreading points, said loop spreading points each having a wall structure adapted to permit the needle beards to remain open while the said points are engaged in the needle grooves, mechanism including cams on said cam shaft operative when the cam shaft is shifted longitudinally for moving said needles and loop spreading points relative to each other to cause the points to enter the grooves of selected needles to engage loops thereon and spread the same over adjacent needles, and pattern controlled mechanism, operative when the cam shaft is shifted longitudinally, for causing the first named cam to actuate said narrowing head mechanism in preselected courses of the fabric and for preventing actuation of the narrowing head mechanism in other courses of the fabric.

12. In the art of knitting a spread loop fabric on a straight knitting machine having a series of spring beard needles and a series of loop spreading points each having an apertured wall structure adapted to enable the needle beards to open while the needles and points are in engagement with each other, the method which comprises forming loops in a course composed of alternate sinker and needle loops with needles in said needle loops, causing certain of said needles and said points to go to press, relatively moving said needles and points in a manner to decrease the overlap therebetween and cause the needle beards to open, causing the needles and points to descend together into the knockover bit structure thereby to enable selected needle loops to slide under the beards of the needles and be retained thereby during the loop spreading operation, and relatively moving said needles and points after the same have descended into the knockover bit structure to cause the needles and points to again assume their usual positions relative to each other.

13. In the art of knitting a spread loop fabric on a straight knitting machine having a series of spring beard needles and a series of loop spreading points each having an apertured wall structure adapted to enable the needle beards to open while the needles and points are in engagement with each other, the method which comprises forming loops in a course composed of alternate sinker and needle loops with needles in said needle loops, causing certain of said needles and said points to go to press, retarding the downward movement of said points relative to said needles after the same have gone to press to cause the needle beards to open, causing the needles and points to descend together into the knockover bit structure thereby to enable selected needle loops to slide under the beards of the needles and be retained thereby during the loop spreading operation, and accelerating the downward movement of said points relative to the needles after the same have descended into the knockover bit structure to cause the needles and points to again assume their usual positions relative to each other.

14. In the art of knitting a spread loop fabric on a straight knitting machine having a series of spring beard needles and a series of loop spreading points each having an apertured wall structure adapted to enable the needle beards to open while the needles and points are in engagement with each other, the method which comprises forming loops in a course composed of alternate sinker and needle loops with needles in said needle loops, causing certain of said needles and said points to go to press, accelerating the downward movement of said needles relative to said points to cause the needle beards to open, causing the needles and points to descend together into the knockover bit structure thereby to enable selected needle loops to slide under the beards of the needles and be retained thereby during the loop spreading operation, and retarding the movement of said needles relative to said points after the same have descended into the knockover bit structure to cause the needles and points to again assume their usual positions relative to each other.

GUSTAV GASTRICH.